(12) United States Patent
Gupta

(10) Patent No.: US 9,898,347 B1
(45) Date of Patent: Feb. 20, 2018

(54) SCALING COMPUTING RESOURCES IN A CLUSTER

(71) Applicant: SAP SE, Walldorf (DE)

(72) Inventor: Vipul Gupta, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 15/459,473

(22) Filed: Mar. 15, 2017

(51) Int. Cl.
*G06F 9/46* (2006.01)
*G06F 9/50* (2006.01)
*G06F 9/48* (2006.01)

(52) U.S. Cl.
CPC .......... *G06F 9/5083* (2013.01); *G06F 9/4881* (2013.01)

(58) Field of Classification Search
None
See application file for complete search history.

(56) References Cited

U.S. PATENT DOCUMENTS

| | | | | |
|---|---|---|---|---|
| 2003/0237084 A1* | 12/2003 | Neiman | ................ | G06F 9/5038 718/102 |
| 2006/0106931 A1* | 5/2006 | Richoux | ............... | G06F 9/4881 709/226 |
| 2007/0022425 A1* | 1/2007 | Jackson | ................ | G06F 9/5027 718/104 |
| 2007/0233870 A1* | 10/2007 | Goto | ..................... | G06F 9/5033 709/226 |
| 2008/0082933 A1* | 4/2008 | Howard | ................ | G06F 9/5072 715/771 |
| 2013/0238785 A1* | 9/2013 | Hawk | .................... | G06F 9/5072 709/224 |
| 2014/0006597 A1* | 1/2014 | Ganguli | ................ | G06F 9/5072 709/224 |
| 2014/0052674 A1 | 2/2014 | Aggarwal | | |
| 2016/0349358 A1 | 12/2016 | Noda | | |

FOREIGN PATENT DOCUMENTS

EP    2034406 A1    3/2009

OTHER PUBLICATIONS

"European Application Serial No. 17000761.1, Search Report dated Jan. 3, 2018", 12 pgs.

* cited by examiner

*Primary Examiner* — Dong Kim
(74) *Attorney, Agent, or Firm* — Schwegman Lundberg & Woessner, P.A.

(57) ABSTRACT

Systems and methods are provided for receiving a request for an allocation of a task in a cluster comprising a plurality of client nodes, determining a node type for the task, based on mapping the task to a list of categories, wherein at least two of categories in the list of categories overlap in range. The systems and methods further providing for searching for available client nodes based on the node type for the task to select a client node to allocate the task, determining a zone of the selected client node, wherein the zone is mapped to the list of categories, determining a wait algorithm associated with the zone of the selected node, and contacting the selected client node and passing the task and the wait algorithm to the selected client node.

20 Claims, 13 Drawing Sheets

| CPU / IO | Idle | Average | Overloaded |
|---|---|---|---|
| Negligible | Integration_Flows, Data_Replication, Long_Service_Requests, Simple_Requests, Short_Duration_Monitoring, All_Basic_Flows | Heavy_Data_Medium_Compute, Long_Service_Requests, All_Basic_Flows, Short_Duration_Monitoring, All_Basic_Flows | Data_Transfer_Flows, All_Light_Flows |
| Light | Data_Replication, Long_Service_Requests, Simple_Requests, | Analytics_Load, Data_Replication, Long_Service_Requests, Simple_Requests, Short_Duration_Monitoring, | Data_Transfer_Flows, All_Light_Flows |
| Medium | Encryption_Requests, Bulk_Encryption_Loads | Long_Service_Requests, Simple_Requests, Bulk_Encryption_Loads Simple_Requests, Short_Duration_Monitoring, Encryption_Requests | Only_Pass_Through, Simple_Requests, Short_Duration_Monitoring, |
| Heavy | Light_Data_Heavy_Compute | | Only_Pass_Through, Simple_Requests, Short_Duration_Monitoring, |

FIG. 5

SCALING COMPUTING RESOURCES IN A CLUSTER

BACKGROUND

Scaling existing systems and solutions to the ever growing requirements and needs of its customers is a problem faced by cloud systems and networks. With the spike in the amount of data, comprising of master data of the customers, generation of purchase orders, requisition objects, legal documents, approval trail, and so forth, the demand on the system resources has increased extensively. As the business and demands of the customers have increased, so has the revenue, and so have the resources deployed to serve the customers. However, since the system is a multi-tenant shared system, where resources and computing power are shared between different tenants, checks are put in place to ensure that the request sizes are throttled and a malicious user or program does not have an impact on others.

While such throttling of resources is an essential requirement to keep the system running properly during sudden spikes of data requests or during malicious requests by an attacker or abnormal system, throttling has an impact on the actual business requirement of the data required to complete a business process. Assume a business application programming interface (API) is throttled to return only the latest 500 data elements even though the request might have been made for data for the last six months comprising of 8000 objects. In such a scenario, throttling of resources acts in a counterproductive manner to the business needs. Moreover, this necessitates an addition of more complexity in the software system by setting up offline and batch systems to retrieve such data. The addition of such processes and offline batch systems only adds to the complexity and unnecessary duplication of multiple end points for the same resources to the ever growing space of customer integrations in enterprise software systems.

BRIEF DESCRIPTION OF THE DRAWINGS

Various ones of the appended drawings merely illustrate example embodiments of the present disclosure and should not be considered as limiting its scope.

FIG. 5 is a table illustrating example CPU usage categories and input/output (I/O) usage categories, according to some example embodiments.

DETAILED DESCRIPTION

Figure 1:
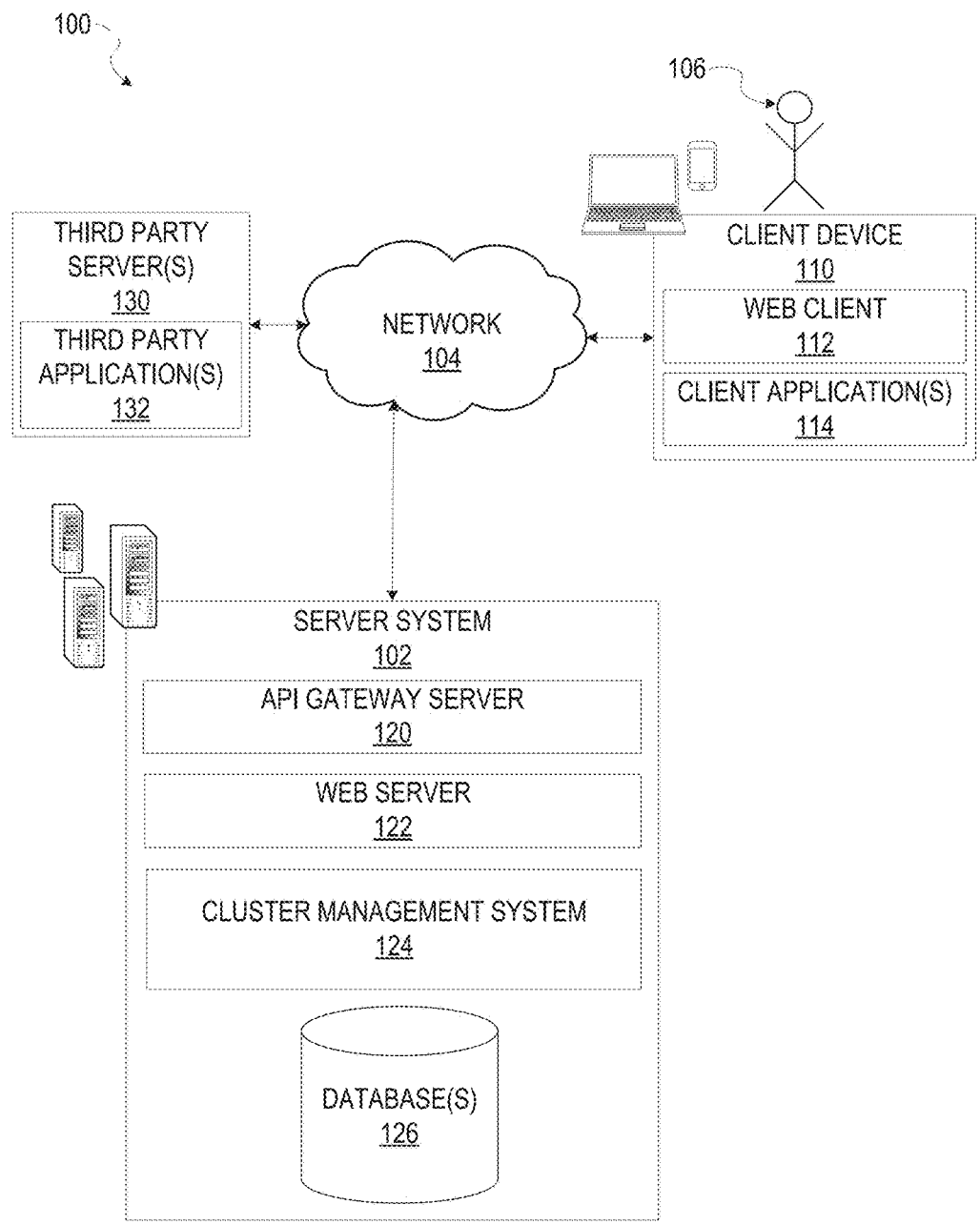
FIG. 1 is a block diagram illustrating a networked system, according to some example embodiments.

Systems and methods described herein relate to efficiently processing operations on various data loads which are throttled in a system, such as an enterprise system. Example embodiments include unique data structures, corresponding algorithms, and a design, which are used to efficiently process operations on various data loads that are throttled in the enterprise system. Some example embodiments alleviate the need to introduce alternative offline and batch solutions for processing the same resource.

An enterprise distributed compute cluster may be used to run tasks of various loads and sizes. Throttling resources may decrease the task size and scale the system. Careful experiments, however, have proven that simple scaling by doing round-robin or random allocations of tasks does not utilize the cluster efficiently. As new tasks are received, existing tasks are run, tasks are split into smaller tasks, or when a task size reduces due to throttled application programming interfaces (APIs), the state of the load on the system changes in a continuous fashion. Classifying a node as low-load based on just one or two parameters may not be a correct way to classify the system resources in the computing cluster.

For example, classifying the load of a host or node by comparing a metric like central processing unit (CPU) usage, and classifying nodes based on rules such as "Anything<=CPU 60% usage is lightweight" and "Anything>60% usage is heavy weight" is a widely used approach. This type of approach, however, leads to inconsistent usage of hardware resources. For instance, a node at 59% CPU usage cannot be put in the same category as a node with 10% CPU usage, even though they are both "lightweight." Assuming both to be just lightweight and allocating tasks to these in some pre-determined manner is not going to scale the cluster properly to its full capacity as there will be longer queues and wait times of nodes in the system at 59% CPU usage than the node at 10% CPU usage.

A more correct and practical real life use case is a scenario where a data value can be considered to be both on the verge of exiting one category (e.g., X) and on the initial phase of the next category (e.g., Y). This kind of categorization opens up the ability to perform better allocations of tasks by assigning a node to a task which fits to both X or Y requirements. For example, a new task could require some level of system performance. Example embodiments describe data structures, algorithms, and design to scale cluster resources to be used more efficiently by removing such allocations and classifications of load in the system, expected load of tasks, and so on.

Embodiments described herein may provide a number of benefits. For example, example embodiments describe an online solution where an existing API or end-point does not need to be taken off-line for testing retrieval or processing of a large amount of customer data. Example embodiments allow for isolation and sharing where, in a multi-tenant solution, if tenants share a resource, allow an algorithm to tune itself to be indirectly aware of other real-time and API requests in the system.

In another example, no replication is needed. For example, no additional resources or mirrored servers may be required solely for batch processing purposes (e.g., there is no need to take the processing of larger loads off the system to another system). Example embodiments may tune and adapt to the current workload. The only additional resources may be cluster manager nodes or instances which maintain the state of the system and allocate resources in a dynamic manner.

Furthermore, example embodiments may use system resources in the most optimal manner, and the system may not slow down the processing to low rates. Moreover, the primary workload (e.g., API calls with small data requests) may get the first priority, and running of the larger loads may not affect the performance of primary smaller workloads irrespective of the dynamic nature of the workload. In addition, example embodiments may provide for zero manual intervention and the system may adapt itself to the changing resource utilization in an ongoing basis. Finally, adaptive algorithms and techniques may require zero staging efforts. For example, adaptive algorithms and techniques may not require staging and testing for datasets of different sizes and characteristics. Example algorithms may scale and adapt to different environments and systems of different sizes, be it large or small.

FIG. 1 is a block diagram illustrating a networked system 100, according to some example embodiments. The system 100 may include one or more client devices such as client device 110. The client device 110 may comprise, but is not limited to, a mobile phone, desktop computer, laptop, portable digital assistant (PDA), smart phone, tablet, ultrabook, netbook, laptop, multi-processor system, microprocessor-based or programmable consumer electronic, game console, set-top box, computer in a vehicle, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth. The client device 110 may be a device of a user that is used to request and receive information via a digital assistant, and so forth.

One or more users 106 may be a person, a machine, or other means of interacting with the client device 110. In example embodiments, the user 106 may not be part of the system 100, but may interact with the system 100 via the client device 110 or other means. For instance, the user 106 may provide input (e.g., voice, touch screen input, alphanumeric input, etc.) to the client device 110 and the input may be communicated to other entities in the system 100 (e.g., third party servers 130, server system 102, etc.) via a network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110.

The system 100 may further include a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the public switched telephone network (PSTN), a cellular telephone network, a wireless network, a WiFi network, a WiMax network, another type of network, or a combination of two or more such networks.

The client device 110 may access the various data and applications provided by other entities in the system 100 via web client 112 (e.g., a browser, such as the Internet Explorer® browser developed by Microsoft® Corporation of Redmond, Wash. State) or one or more client applications 114. The client device 110 may include one or more client applications 114 (also referred to as "apps") such as, but not limited to, a web browser, messaging application, electronic mail (email) application, an e-commerce site application, a mapping or location application, a digital assistant application, and the like.

In some embodiments, one or more client applications 114 may be included in a given one of the client device 110, and configured to locally provide the user interface and at least some of the functionalities, with the client application 114 configured to communicate with other entities in the system 100 (e.g., third party servers 130, server system 102, etc.), on an as needed basis, for data and/or processing capabilities not locally available (e.g., access enterprise resource planning (ERP) or customer relationship management (CRM) data, to request data, to authenticate a user 106, to verify a method of payment, etc.). Conversely, one or more applications 114 may not be included in the client device 110, and then the client device 110 may use its web browser to access the one or more applications hosted on other entities in the system 100 (e.g., third party servers 130, server system 102, etc.).

A server system 102 may provide server-side functionality via the network 104 (e.g., the Internet or wide area network (WAN)) to one or more third party servers 130 and/or one or more client devices 110. The server system 102 may include an application program interface (API) gateway server 120, a web server 122, and cluster management system 124, that may be communicatively coupled with one or more databases 126.

The one or more databases 126 may be one or more storage devices that store data related to an ERP system, user data, and other data. The one or more databases 126 may further store information related to third party servers 130, third party applications 132, client devices 110, client applications 114, users 106, and so forth. The one or more databases 126 may include cloud-based storage in some embodiments.

The server system 102 may be a cloud computing environment, according to some example embodiments. The server system 102, and any servers associated with the server system 102, may be associated with a cloud-based application, in one example embodiment.

The cluster management system 124 may manage resources and provide back-end support for third party servers 130, third party applications 132, client applications 114, and so forth, which may include cloud-based applications. The cluster management system 124 may receive task allocation requests, process requests, manage resources related to tasks, and so forth.

The system 100 may further include one or more third party servers 130. The one or more third party servers 130 may include one or more third party application(s) 132. The one or more third party application(s) 132, executing on third party server(s) 130, may interact with the server system 102 via API server 120 via a programmatic interface provided by the API server 120. For example, one or more the third party applications 132 may request and utilize information from the server system 102 via the API server 120 to support one or more features or functions on a website hosted by the third party or an application hosted by the third party. The third party website or application 132, for example, may provide various functionality that is supported by relevant functionality and data in the server system 102.

Figure 2:
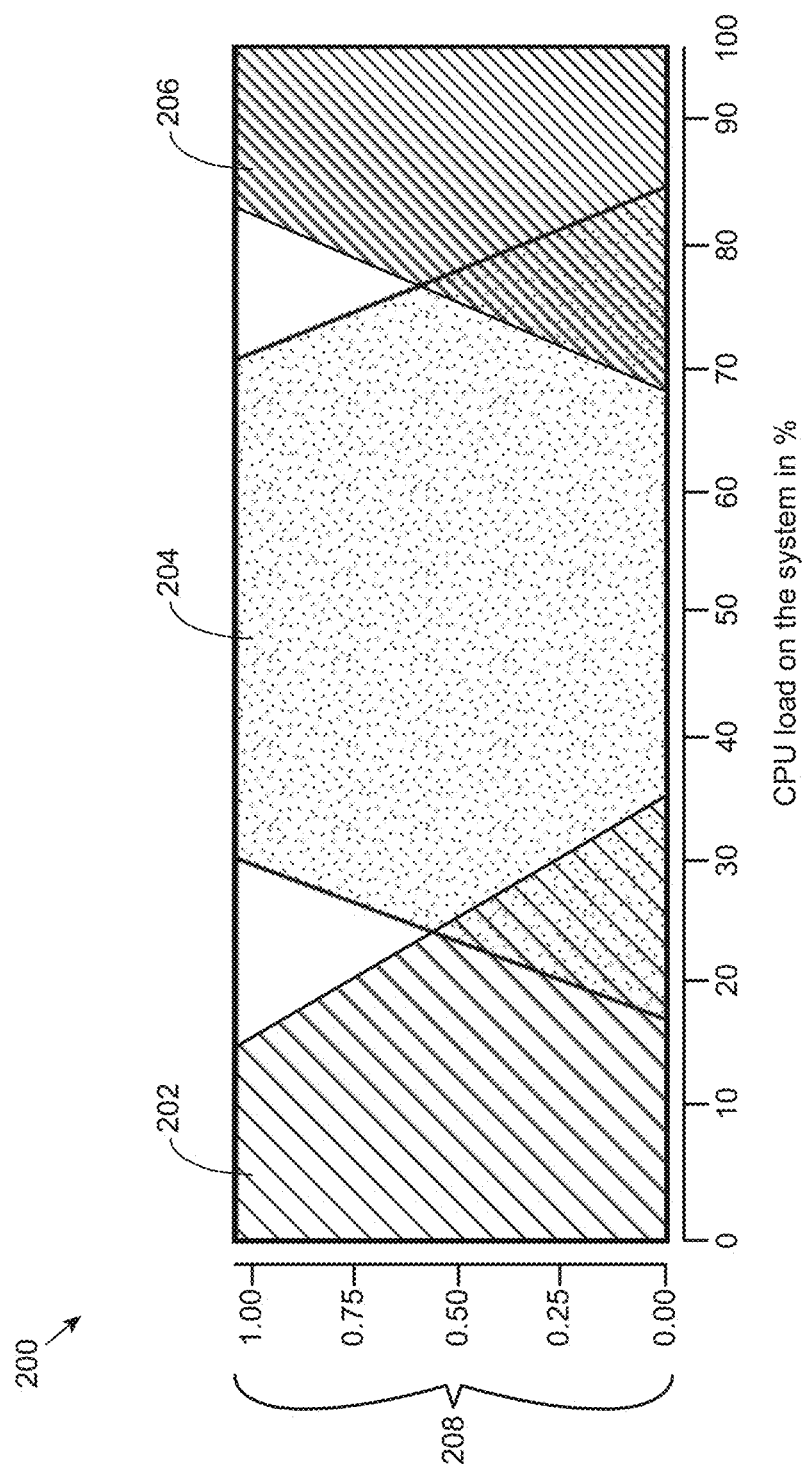
FIG. 2 is a diagram illustrating example central processing unit (CPU) usage categories, according to some example embodiments.

As explained above, using very discrete boundaries does not work well for using resources efficiently. In example embodiments, practical load classifications for real life CPU usage can be allocated based on categories. Using a simple example, a CPU usage can be visualized across three categories as shown in FIG. 2. This is just one example of a set of categories and ranges for the example set of categories. It is understood that there may be more or less categories and different ranges for each category, in other examples. The number and boundaries for categories may be determined based on system analysis for a period of time and may be periodically re-analyzed and updated based on changes in the system.

Using the example 200 in FIG. 2, a first category may be an idle category 202, a second category may be an average category 204, and a third category may be an overloaded category 206. In this example, the idle category 202 may range from 0 to 35%, the average category 204 may range from 17% to 84%, and the overloaded category 206 may range from 68% to 100%. A CPU usage load is mapped to a real number 208 which is specific to a category.

The type of mapping shown in FIG. 2 is referred to herein as category sets, where each input value maps to a specified category, such as idle, average, and overloaded, and is also assigned a continuous value in the real number range of [0,1]. Performing such a categorization moves away from the approaches of using discreet boundaries which are generally followed, such as less than 60% CPU usage is idle and more than 60% CPU usage is overloaded. By assigning a value, the system may figure out how well an element belongs to a category. For example, a 20% CPU usage would map to a confidence level of 0.75 in the idle category 202.

Category sets may be used to assign a state of a client node to a certain category, compute slope and confidence boundaries of the state of resources on a node, compute zones for sending status messages, allocate tasks to a node on the cluster, allocate wait algorithms based on node resource categories, and so forth.

By introducing category sets, every value gets mapped to certain categories and still every value in every category can map to its membership level in the category. This helps in setting up rules for proper allocation and classification of load on various nodes (e.g., client nodes as described below) comprising the cluster.

For example, if the CPU usage on a node is 25%, it lies in both the idle category 202 and the average category 204. This provides an opportunity to do proper allocation of the tasks based on further granularity, such as:

Tasks pending for allocation:
X—Medium intensity
Y—Low intensity
Z—Heavy Requirements Allocation rules may be defined in the system as follows:
A. CPU load is Idle and I/O Usage is Light—Allocate medium intensity tasks (and further rules may even define how many tasks can be allocated)
B. CPU load is average and IO requirements are High— Allocate low intensity tasks Allocation of the tasks may take place based on execution of the allocation rules. For example, by using the two rules A and B shown above, task X gets allocated to one of the nodes coming as an output of rule A and task Y gets allocated to one of the nodes coming as an output from rule B. A node with 25% CPU usage may be a candidate for both X and Y tasks (assuming memory needs are met).

For setting up a category set, boundary ranges are needed for each individual category in the category set. A very simple approach to set up boundaries for each category can be can be a setup with rules such as (X, Y) where X is the position on the X axis and Y is the position on the Y axis.

A category set for CPU usage may defined as follows:
Average: (17, 0) (32, 1) (70, 1) (84, 0)
Idle: (0, 1) (15, 1) (35, 0)
Overloaded: (68, 0) (85, 1) (100, 1)

Figure 3:
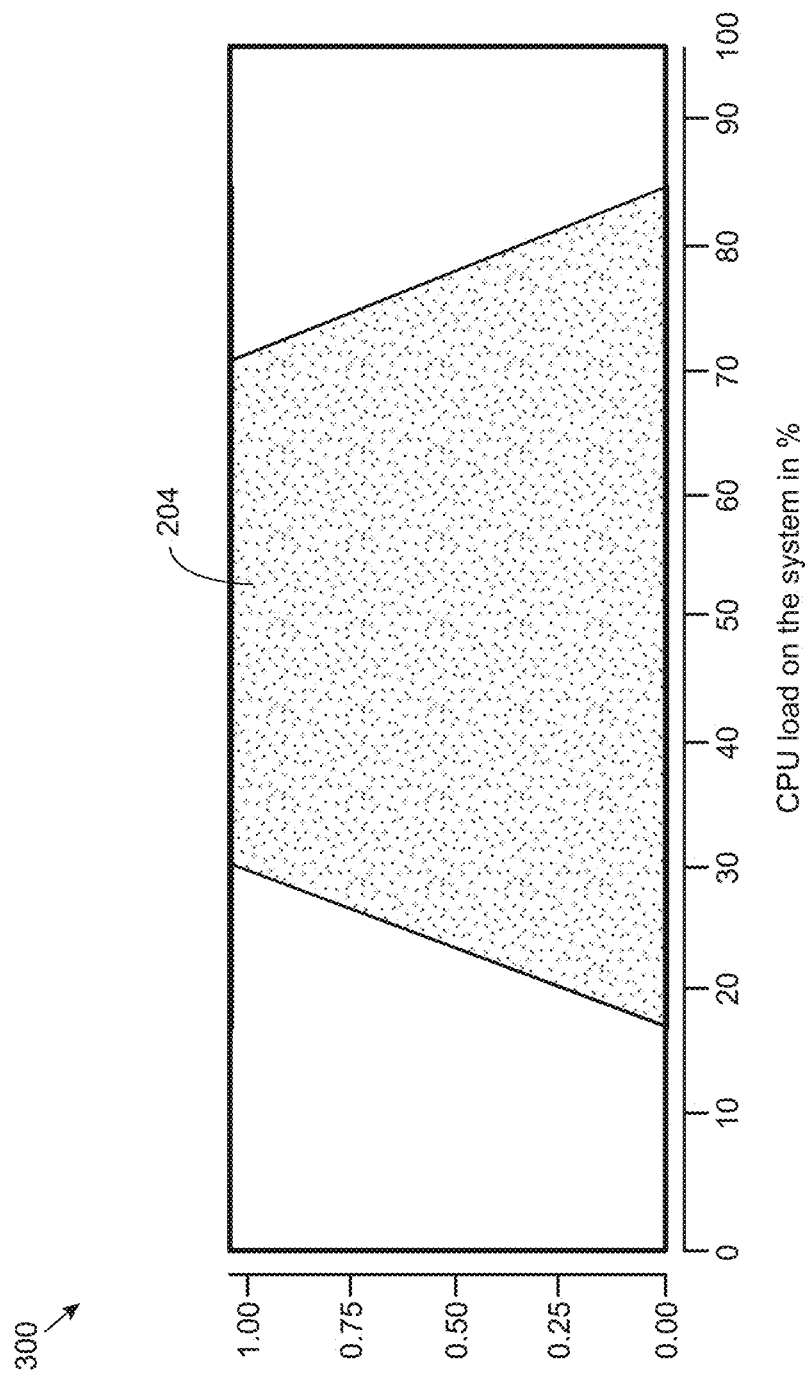
FIGS. 3 and 4 show diagrams illustrating an example CPU usage category, according to some example embodiments.
Figure 4:
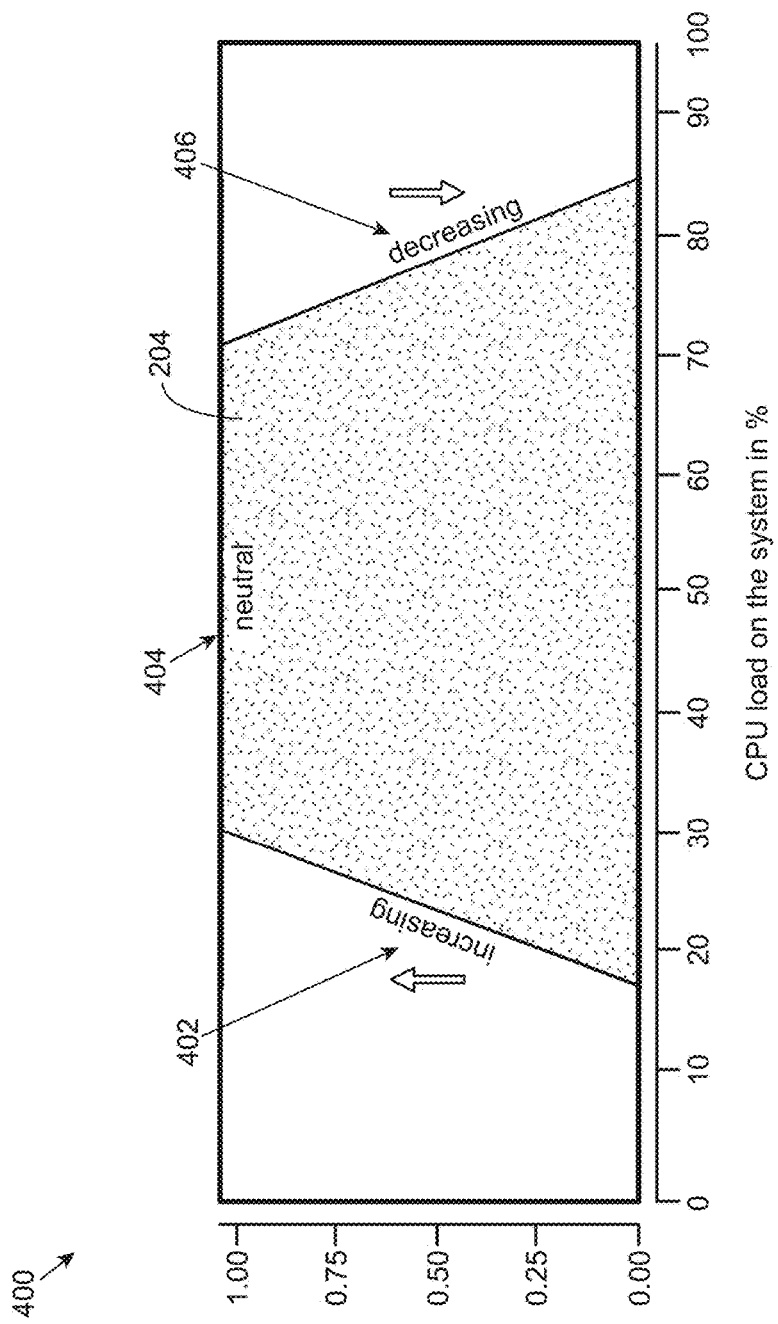

The average category 204 is demonstrated in the example 300 in FIG. 3. The example 300 shows how the slope values for applying the computation and allocation rules are computed. FIG. 4 shows an example 400 with an example definition of the slope of the category. The example 400 for the average category 204 shows an increasing slope 402, a neutral slope 404, and a decreasing slope 406. The slope value computed in FIG. 4 defines an additional indicator for the membership of the element in a category, whether the element is an early or old member. For example, the slope of the of confidence level of the category, which is either increasing or decreasing, helps to refine the allocations of tasks to nodes by using advanced packing algorithms. In this example, there are three different slope values, but not all are applicable in all situations. For example, the average category 204 may have all three slope possibilities: increasing, decreasing, and neutral. The idle category 202 may have two applicable slope values: decreasing and neutral. The overloaded category 206 may have two applicable slope values: increasing and neutral.

Some example data structures for category sets may comprise the following:

```
Point {
    Double X;
    Double Y;
}
Enum Slope {
    Increasing;
    Decreasing;
    Neutral;
    Invalid;
}
Category {
    String name
    String measurementType
    String value
    Long lowerLimit a
    Long upperLimit d
    Long lowerSupportLimit b
    Long upperSupportLimit c
}
CategoryResult {
    Double confidenceLevel;
    Slope slopeValue;
    CategoryResult (Double confidenceLevel, Slope slopeValue) {
        this.confidenceLevel=confidenceLevel;
        this.slopeValue=slopeValue;
    }
}
```

Some example algorithms for category sets may comprise the following:

```
CategorySet {
  OrderedSet<Point> pointSet;
  Double confidenceLevel (x, Category category) {
    // Given a, b, c, d values as explained earlier.
    return Math.Max (
      Math.Min   (
                    (x - category.a/(category.b -
      category.a),
                    1,
                    (category.d - x)/(category.d - category.c)
                 ),
      0);
  }
  Category Set confidenceLevelWithSlope (x) {
  If(a < b < c < d)
  {
      If(x < a or x > d)
          return new CategoryResult(0, Invalid)
      else if(a <=x && x <= b)
          return new CategoryResult((x - category.a)/(category.b -
      category.a),
                                    Increasing)
      else if(b <=x && x <= c)
          return new CategoryResult(1, Neutral)
      else if(c <=x && x <= d)
          return new CategoryResult((category.d - x)/(category.d -
category.c),
                                    Decreasing)
  }
  else If (a = b = -Infinity && c < d)
  {
      If(x > d)
          return new CategoryResult(0, invalid)
      else if(x < c)
          return new CategoryResult(1, Neutral)
      else if(c <=x && x <= d)
          return new CategoryResult((category.d - x)/(category.d -
category.c),
                                    Decreasing)
  }
  else If (c = d = +Infinity && a < b)
  {
      If(x > b)
          return new CategoryResult(1, Neutral)
      else if(x < a)
          return new CategoryResult(0, invalid)
      else if(a <= x && x <= b)
          return new CategoryResult((x - category.a)/(category.b -
      category.a),
                                    Increasing)
  }
}
```

Example embodiments provide for a new compute cluster manager server node ("manager server node") to be created in a compute cluster comprising a plurality of nodes. Any task request, from any system, may be received by a manager server node. A node may be a self-contained container node and could also be a host as may be applicable in a specific cluster. Each node on the cluster has a new client process. These nodes are referred to as compute cluster client nodes ("client node"). The manager server nodes are responsible for maintaining the state of the cluster at any point of time and run the various optimization and allocation algorithms. An algorithm, such as the Paxos algorithm or raft algorithm, may be executed on the manager server node to maintain consensus about the state of the cluster and to elect a leader amongst a plurality of manager server nodes.

Algorithms to compute the cluster state are run on the manager server nodes. The manager server nodes are responsible for allocation of tasks on the various nodes. Rather than defining simple boundaries for different factors like less than 60% CPU as idle, and more than 60% as overloaded, mathematical functions defining the continuous boundary lines are set and categorized into ranges, and rules are set to evaluate these continuous boundaries, as described above.

In some examples, there may be more than one manager server node. When there is more than one manager server node, one manager server node is appointed as a leader and will execute cluster state and allocation strategy. Client node status messages (e.g., polling for status on each client or sending frequent status messages from each client) may overload the system functioning with just the client node status messages; hence, time intervals for sending such messages are set. The time interval is also decided amongst the node by consensus within a range. These time intervals are much longer than typical so as not to overload the system and because of other events that trigger client node status messages, making it unnecessary to do more frequent status messages.

Apart from time intervals, there are also specific events which trigger client node status messages such as restart of a client node, finishing of all jobs on a client node, addition of a new client node to the cluster, and so forth. Another event that triggers a client node status message includes a zone change for the client node, as explained below. The state of the cluster is replicated between all of the manager server nodes.

In one example, two parameters may be used to allocate tasks to nodes: CPU status and memory (e.g., I/O). By categorizing the nodes into various categories, a look up rules table may be created to be used to do allocations. In one example, CPU usage categories may comprise idle, average, and overloaded, and I/O usage categories may comprise negligible, light, medium, and heavy. With this type of categorization, allocating new tasks on the cluster can be crafted as shown in FIG. 5. FIG. 5 is a table illustrating example CPU usage categories and I/O usage categories and corresponding mapping of tasks for a combination of such categories, according to some example embodiments.

The CPU usage categories shown in the table 500 include idle 502, average 504, and overloaded 506. The I/O usage categories shown in table 500 include negligible 508, light 510, medium 512, and heavy 514. The values inside the table 500 (e.g., integration_flows, heavy_data_medium_compute, etc.) shown in FIG. 5 represent availability of nodes for different kind of tasks in the system.

As described above, analysis of tasks and performance in the system over a period of time may result in determining which types of tasks require which types of resources. Each node in a cluster is classified into a category. For example, when a manager server node receives a task allocation request, it may use a table like table 500 to determine which node(s) may be appropriate to service the request. In one example, a manager server node may receive a task for a data transfer flow. The manager server node may analyze the task and map it to the table to determine what type of node may be able to process the task. In this example, the task may be allocated to a node type with negligible I/O and an overloaded CPU usage or to a node type with light I/O and an overloaded CPU usage (e.g., because CPUs are not required for data transfers).

Figure 6:
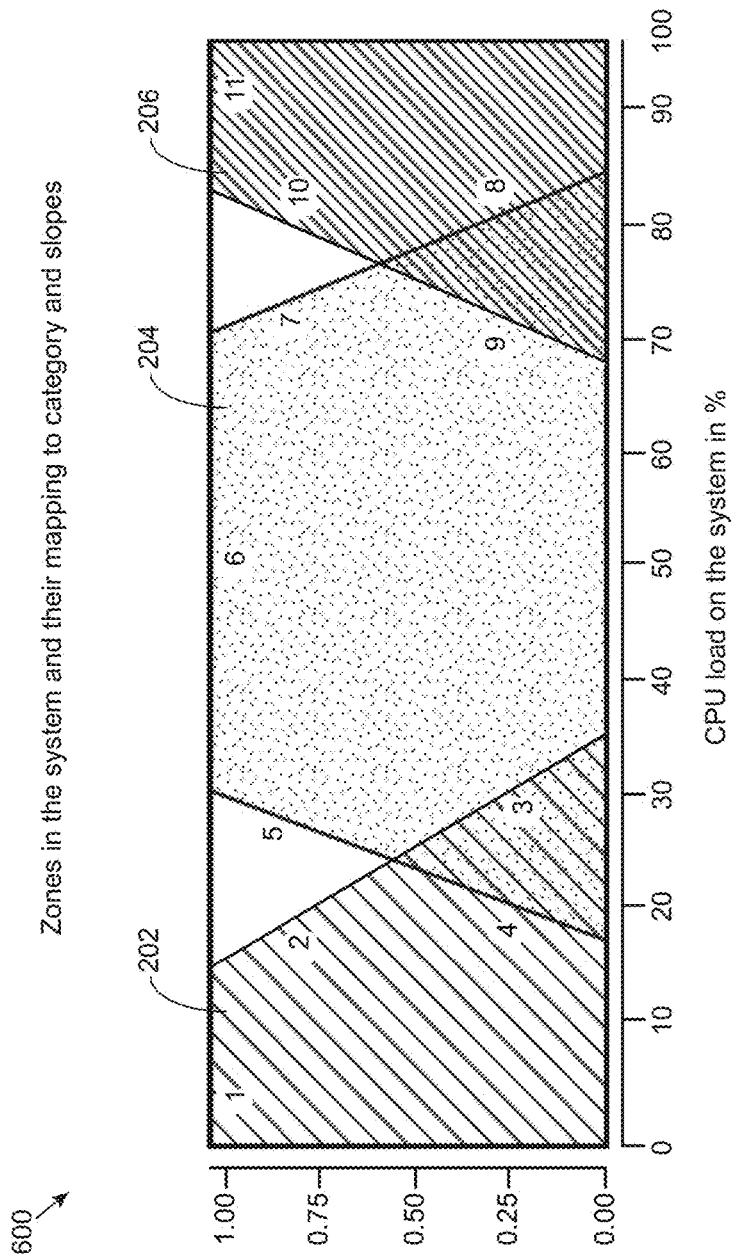
FIG. 6 is a diagram illustrating example zones mapped to CPU usage categories, according to some example embodiments.

The client node cluster may further be looked at as being made of various zones. FIG. 6 shows an example 600 where eleven zones may be used. In this example, category definition of CPU usage percentages may comprise the following:

Idle: (0, 1) (15, 1) (35, 0)
Average: (17, 0) (32, 1) (70, 1) (84, 0)
Overloaded: (68, 0) (85, 1) (100, 1)

Each pair of tuples may represent a line segment, defining one of the boundary lines of one of the categories. Pairs may be listed by taking two line segments (comprising two points each), in order from the different categories. For example:

(0,1) (15,1)
(15,1) (35,0)
(17, 0) (32, 1)
(32, 1) (70, 1)
(70, 1) (84, 0)
(68, 0) (85, 1)
(85, 1) (100, 1)

By default, each line segment may be marked as a zone, in increasing order. For example:

| Points defining the boundaries of a zone | Zone |
| --- | --- |
| (0, 1) (15, 1) | 1 |
| (15, 1) (35, 0) | 7 |
| (17, 0) (32, 1) | 3 |
| (32, 1) (70, 1) | 4 |
| (70, 1) (84, 0) | 5 |
| (68, 0) (85, 1) | 6 |
| (85, 1) (100, 1) | 7 |

For every two pairs in order, whether the line segment intersects may be computed using the following pseudo-code:

```
// The main function that returns true if line segments—
   'p1q1' and 'p2q2' intersect.
boolean checkintersection (Point p1, Point q1, Point p2,
   Point q2)
}
   // Find the four orientations needed
   int o1=orientation(p1, q1, p2);
   int o2=orientation(p1, q1, q2);
   int o3=orientation(p2, q2, p1);
   int o4=orientation(p2, q2, q1);
   if (o1 !=o2 && o3 !=o4)
      return true;
   // p1, q1 and p2 are collinear and p2 lies on segment
      p1q1
   if (o1==0 && onSegment(p1, p2, q1)) return true;
   // p1, q1 and p2 are collinear and q2 lies on segment
      p1q1
   if (o2==0 && onSegment(p1, q2, q1)) return true,
   // p2, q2 and p1 are collinear and p1 lies on segment
      p2q2
   if (o3==0 && onSegment(p2, p1, q2)) return true;
   // p2, q2 and q1 are collinear and q1 lies on segment
      p2q2
   if (o4==0 && onSegment(p2, q1, q2)) return true;
   return false; // Doesn't fall in any of the above cases
}
// Given three collinear points p, q, r, the function checks
   if point q lies on line segment 'pr'
boolean onSegment(Point p, Point q, Point r)
{
   if (q.x<=max(p.x, r.x) && q.x>=min(p.x, r.x) &&
      q.y<=max(p.y, r.y) && q.y>=min(p.y, r.y))
      return true;
   return false;
}
//to find orientation of ordered triplet (p, q, r).
//the function returns following values
// 0→p, q and r, are collinear
// 1→Clockwise
// 2→Counterclockwise
integer orientation(Point p, Point q, Point r)
{
   int val=(q.y−p.y)*(r.x−q.x)−(q.x−p.x)*(r.y−q.y);
   if (val=0) return 0; // collinear
   return (val>0)? 1: 2; // clock or counter clock wise
}
```

If a pair of line segments intersect, the point of intersection of these lines is computed by solving them simultaneously for the intersection. The intersection point divides the existing zone into two zones at the points of intersection. For example, the line segments represented by the below points intersect at (173/7, 18/35):

| (15, 1) (35, 0) |
| --- |
| (17, 0) (32, 1) |

Based on this point of intersection, the zone allocation table is recomputed, and the zones are reallocated. The revised table may look like the following:

| Points defining the boundaries of a zone | Zone |
| --- | --- |
| (0, 1) (15,1) | 1 |
| (15, 1) (173/7, 18/35) | 2 |
| (173/7, 18/35) (35, 0) | 3 |
| (17, 0) (173/7, 18/35) | 4 |
| (173/7, 18/35) (32, 1 ) | 5 |
| (32, 1) (70, 1) | 6 |
| (70, 1) (84, 0) | 7 |
| (68, 0) (85, 1) | 8 |
| (85, 1) (100, 1) | 9 |

This process is repeated for the remaining pairs of line segments.

Many systems have two pipelines for processing tasks. For example, one pipeline is used for simple tasks and a separate pipeline is used for heavy tasks. Example embodiments allow for elimination of two separate pipelines. Accordingly, some example embodiments provide for a single pipeline to handle both simple (e.g., small) requests and heavy (e.g., large requests).

In one example, the system is throttled, and thus, a large request (e.g., for 5000 objects) may be throttled to return a smaller set of objects at a time (e.g., a request for 5000 objects gets throttled to 10 requests of 500 each). However, if the system keeps executing large requests, this could lead to starvation of smaller requests. In one example, wait strategies are used to manage resources between simple tasks and heavy tasks to address this issue.

Figure 7:
FIG. 7 is a table illustrating example wait algorithms based on CPU usage categories and I/O usage categories, according to some example embodiments.

FIG. 7 shows an example table 700 comprising wait algorithms based on CPU usage categories and I/O usage categories. For example, a request will not wait for very long and will be executed very fast when running an idle resource algorithm. On the other hand, for a longer request in the system where the CPU usage is overloaded and the I/O usage is negligible, a limiting algorithm or fairness algorithm may be run to slow down the system. In one example, wait algorithms may only be executed for heavy requests (e.g., long running requests that the system wants to slow down a bit to be fair to other requests). Example wait algorithms are provided later on below.

Figure 8:
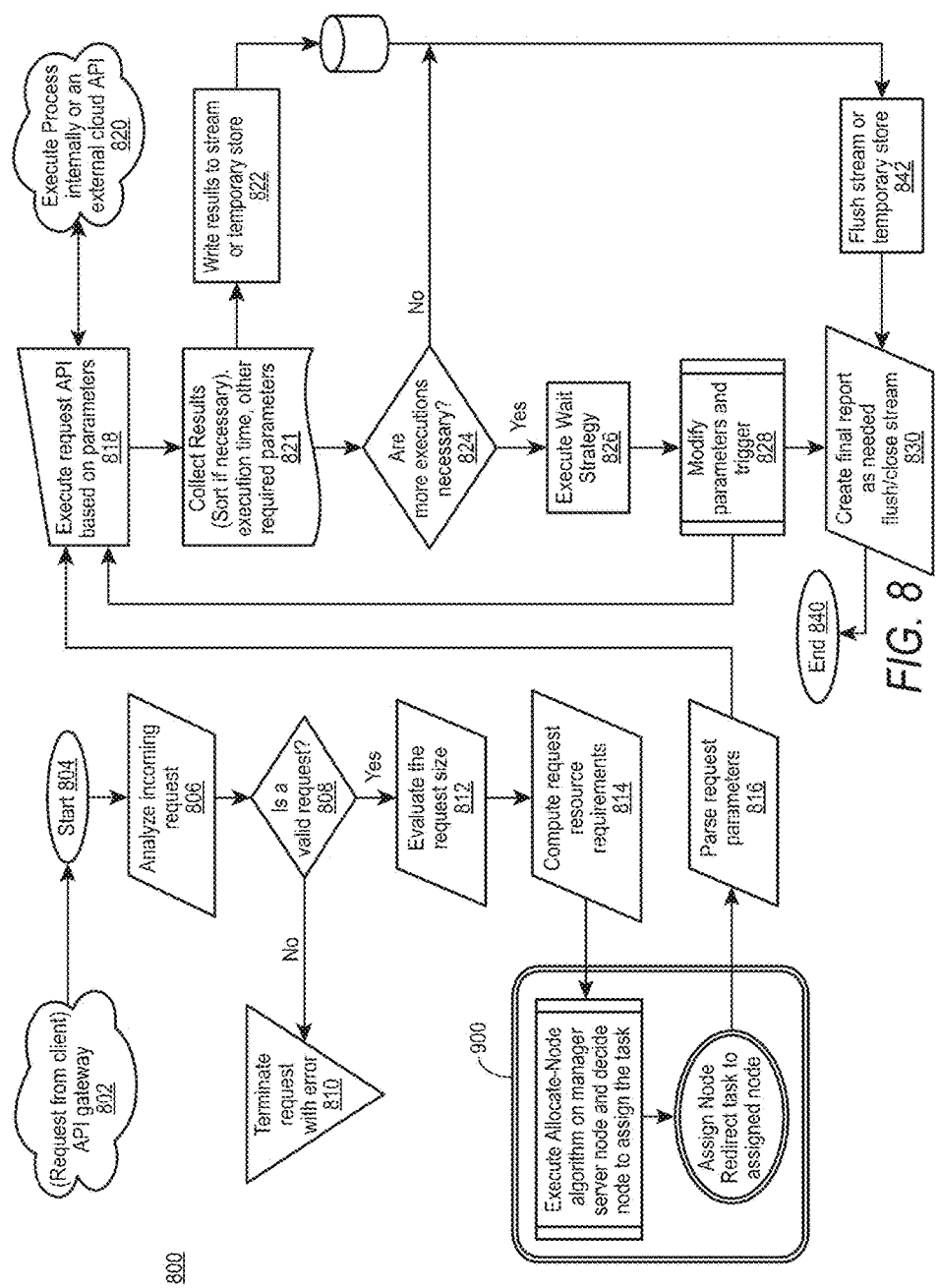
FIGS. 8 and 9 are flow charts illustrating aspects of methods, according to some example embodiments.

FIG. 8 is a flow chart illustrating aspects of a method 800 illustrating an example use case, according to some example embodiments. For illustrative purposes, method 800 is described with respect to the networked system 100 of FIG. 1. It is to be understood that method 800 may be practiced with other system configurations in other embodiments.

In operation 802, a talk allocation request is sent to a server system 102 via an API gateway server 120. For example, a task allocation request may be sent directly via a client device 110 or via a third party server 130. The processing of servicing the request starts at operation 804 when the server system 102 receives the task allocation request. For example, a manager server node in a cluster management system 124 of the server system 102 may receive the task allocation request.

At operation 806, the manager server node analyzes the incoming task allocation request to determine whether it is a valid request at operation 808. If it is not a valid request, the manager server node will terminate the request with an error in operation 810. If the request is valid, the manager server node evaluates the request size in operation 812. In operation 814, the manager server node computes resource requirements for the task. In operation 900, the manager server node executes an allocate-node algorithm and decides a node to assign the task and then assigns the node and redirects the task to the assigned node. The details of operation 900 are further explained below and shown in FIG. 9.

In operation 816, the assigned node (e.g., a client node) parses the request parameters and then executes a request API based on the parameters, in operation 818. In operation 820, the client node executes a process internal or via an external cloud API. In operation 821, the client node collects results (and sorts the results if necessary), execution time, and other required parameters, and writes results to stream or temporary store in operation 822. In operation 824, the client node determines if more executions are necessary. If not, the client node flushes the stream or temporary store at operation 842, creates a final report as needed and flushes/closes the stream at operation 830.

If more execution are necessary in operation 826, the client node executes the associated wait strategy for the task. For example, the client node may have received a wait algorithm from the manager server node previously, or with the task once it is allocated to the client node, to be used as the wait strategy for the task.

In operation 828, the client node modifies parameters and trigger and continues to loop through operations 818-828 until no more executions are necessary (e.g., as determined in operation 824) and then the client node flushes the stream or temporary store at operation 842, creates a final report as needed and flushes/closes the stream at operation 830. The process ends are operation 840.

Figure 9:
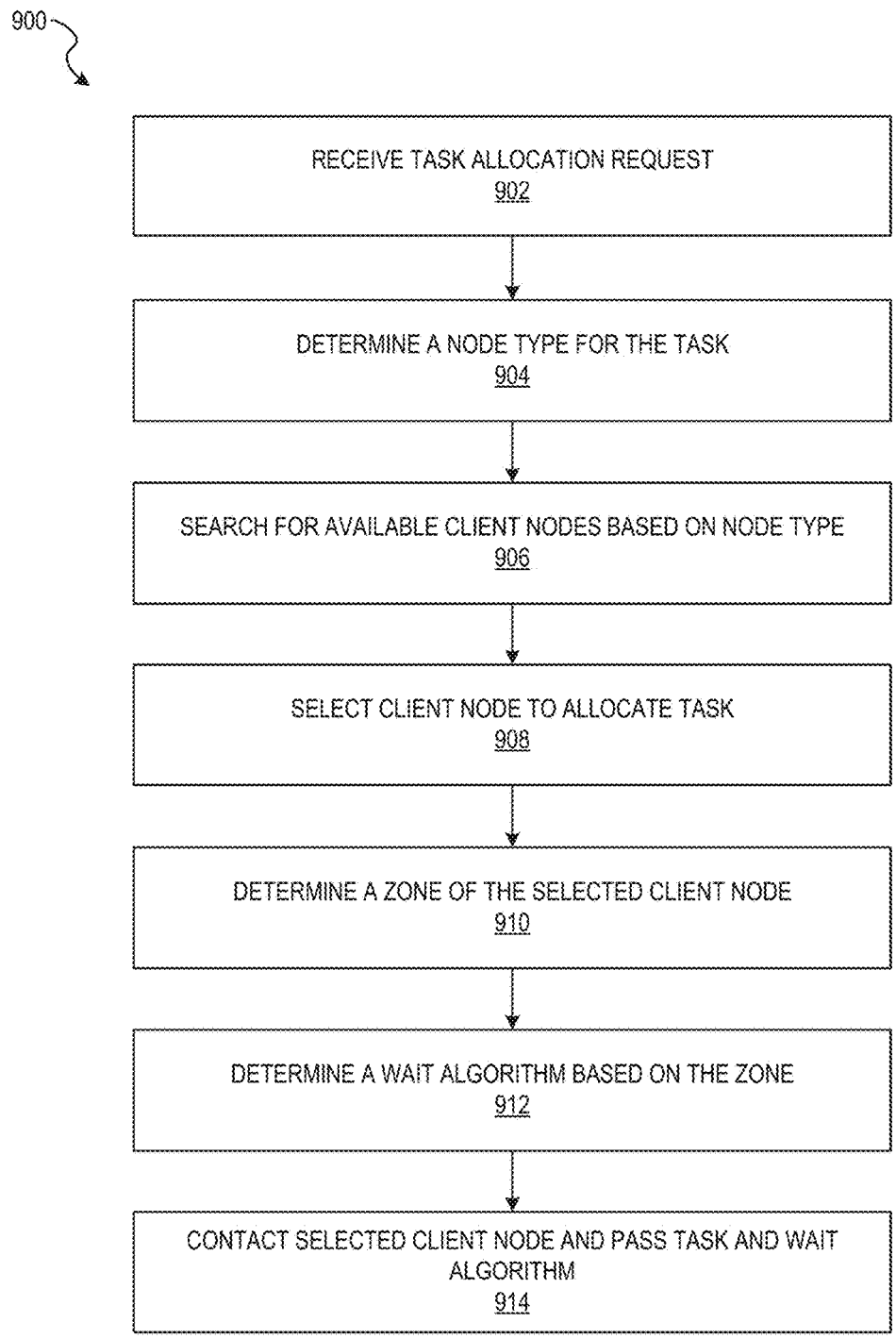

FIG. 9 is a flow chart illustrating aspects of a method 900, for function of a manager server node, according to some example embodiments. For illustrative purposes, method 900 is described with respect to the networked system 100 of FIG. 1. It is to be understood that method 900 may be practiced with other system configurations in other embodiments.

In operation 902, a manager server node receives a task allocation request. As explained above, the manager server node may be one of a plurality of manager server nodes for a cluster comprising a plurality of client nodes. The manager server node may be responsible for determining which of the plurality of manager server nodes to assign the task.

In operation 904, the manager server node determines a node type for the task. For example, the manager server node may consult a rules table (e.g., similar to table 500 in FIG. 5), to map the task to the list of categories. In this way the manager server node may determine a CPU usage category and an I/O use category for the task. In one example, and referring to the table 500 in FIG. 5, the task may be a "Long_Service_Requests" task. Thus, the node type, or categories that are applicable to the task "Long_Service_Requests" are idle CPU/negligible I/O, idle CPU/light I/O, average CPU/negligible I/O, average CPU/light I/O, and average CPU/medium I/O. Accordingly, the manager server node determines that the node type for the task comprises node types of these categories.

Returning to FIG. 9, in operation 906, the manager server node searches for available client nodes based on the node type(s) for the task to select a client node to allocate the task. For example, the manger server node may search for all client nodes with a status associated with any node type(s) for the task. Accordingly, the manager server node may determine which available client nodes have a status associated with the node type(s).

There may be more than one client node associated with the node type(s) for the task. To select the client node, the manager server node may use a number of different approaches. In one example, the manager server node may use a multikey hash table or a multikey search structure. The key for the multikey hash table or the multikey search structure may be a combination of zones for a factor under consideration and the value to search would be the nodes mapping to the corresponding the key and arranged in a priority. The priority may be based on a round-robin, load on the nodes, and so on. The manger server node selects a client node in operation 908.

In operation 910, the manager server node determines a zone of the selected client node. In one example, the manager server node may determine the zone of the selected client node based on a stored status of the selected client node. In another example, the manager server node may determine that a new zone for the selected client node should be calculated because of a change in status of the selected client node since a last status update. In this case, the manager server node may calculate the new zone for the selected client node.

In operation 912, the manager server node determines a wait algorithm based on the zone for the selected client node and/or based on the CUP and I/O categories for the client node. For example, the manager server node may determine the wait algorithm for the selected client node based on mapping the node type of the selected client node to the categories in a wait algorithm table, similar to the table 700 shown in FIG. 7. The manager server node may determine the wait algorithm for the task should be computed based on a status of the selected client node.

In operation 914, the manager server node contacts the selected client node and passes the task and the wait algorithm to the selected client node. The manager server node may update allocation details with the task assigned to the selected client node. These allocation details may be replicated to other manager server nodes in the cluster. The selected client node will then process the task and execute the wait algorithm, as explained earlier.

As described above, the manager server node may receive status updates from each of the plurality of client nodes in the cluster. For example, the manger server node may receive a status message for the selected client node, determine that a zone associated with the selected client node is different from a stored zone, update records for the cluster with the different zone, determine a wait algorithm for the selected client node based on the different zone, and send the wait algorithm to the selected client node.

Likewise a client node may send its status to a manager server node. For example, a client node may sent its current status to a manager server node, receive a response message from the manager server node that may include a new wait algorithm, and update the wait algorithm based on the response message from the manager server node. A client node may also monitor what zone it is in and only send a status message if the zone has changed. In response to the zone change, the client node may receive a new wait algorithm.

Example algorithms for allocating tasks, processing tasks, and ways in which a manager server node in a client node communicate with each other may comprise the following:

```
On Manager Server Node
AllocateNode (IncomingTask task) {
NodeType nodeType=SearchNodeType referring to Table 1
Node node=Search available node based on nodeType
WaitAlgorithm waitAlgorithm=Find wait algorithm referring to Table 700
Zone zone=find zone of node before allocation of new task.
Update Allocation details on the manager server node to maintain load on the nodes
Contact selected node and pass task, waitAlgorithm to the node
}
Get Client_Node_Status_Message (Node node, Zone zone)
{
If zone different than stored zone for zone {
    Update records on manager server node
    Send new wait algorithm to node
  }
}
Get Client_Node_Status_Message (Node node, System_Metrics metrics)
{
Compute zone based on system metrics
If zone different than stored zone for zone {
    Update records on manager server node
    Send new wait algorithm to node
  }
}
On Client Node
```

```
AcceptTask (IncomingTask task, WaitAlgorithm waitAlgorithm) {
   Add task to Task Queue
   // this thread periodically updates the state of the system to the
manager server node
   If (client node Status Thread not running) {
       Start client node Status Thread
   }
   Register waitAlgorithm as the waiting strategy
}
//this thread is run with a long time interval to avoid flooding the
system with Status Messages
Client_Node_Status_Thread {
   run( ) }
       client node Status Message = Create Status Message (Collect
   System metrics)
```

-continued

```
       Status_Message_Response = Send client node Status
   Message
       Update waitAlgorithm from Status_Message_Response
       Sleep (longer period)
   }
}
Node_MonitoringThread {
   Zone currentZone ;
   Node_Monitoring_Thread ( ) {
       currentZone = Get Zone based on metrics from Table 3
   }
   run ( ) {
       //run every second
       Zone zone = GetZone (Get system metrics)
       If( zone != currentZone)
           Send client node Status Message with new Zone
           currentZone = zone
           Get new wait algorithm for this zone
   }
}
```

Example embodiments described herein are used to scale a cluster to allow customers via computing devices to access and process their data in a more scalable and unified fashion without the explosion of integration with multiple endpoints for retrieving the same business resource. In one example end-point and corresponding resource, an API (e.g., "/getResources") may be deployed on a cluster. The API may take start and end time parameters to figure out the ranges of resources to return. The API is throttled or programmed to return only the latest resources in the range. The latest resources may be based on the reverse chronological order of time (e.g., from the latest to the oldest). The cluster may be horizontally scalable (e.g., the load on the cluster can be handled better by adding more and more nodes with the same API build).

The standard process for APIs exposed on corporate gateways has data throttled to certain limits. For larger loads, the organization always has to come out with offline end-points which process data in the background and leads to explosion of endpoints, with multiple endpoints for different data loads being exposed for the same resource. Example embodiments described herein alleviate such needs by using resource allocation strategies that can be used on the corporate API gateway to scale the existing API to varying data loads. There are numerous occasions where the system resources are lying idle and still organizations revert to separate offline mechanisms to handle larger data loads. Example embodiments alleviate such needs for offline mechanisms.

For example, if the system has high loads, example embodiments provide a mechanism to provide a wait strategy so that the online real-time and smaller loads of other tenants are not affected. By using the examples described herein, the overall system architecture is simplified, as no duplicate or offline systems need to be developed to handle loads of different sizes. For very large loads, a conservative wait strategy may be scheduled so that a simple request API on a node can handle and operate like a batch load.

The following example data structures may be used in various example embodiments:

Request {

Time Range—Start // This is just an example and APIs can be throttled

Time Range—End // based on various different parameters.

```
Function <? Implements WaitStrategy>
WaitFunction Parameters
WaitFunction Default values
Response {
    Stream <DataObject>
}
```

The following example algorithms may be using in various example embodiments. For example, pseudocode for an algorithm is shown as follows:

```
Stream<DataObject> getData(String endpoint, long startTime, long EndTime, Function waitStrategy)
{
    OpenResponseStream<DataObject> responseStream;
    while (startTime<endTime)
    {
    // Execute API
    Make the endPoint API call
    {
        data=Collect API results
        runTime=Collect API run time
        if(isFirstRun)
            FirstCallRuntime=runTime
    }
    If results sorted
    {
        lastRecordTime=getTimeStamp of Last Result
    }
    else
    {
        sort results in descending order of timestamp
        lastRecordTime=getTimeStamp of Last result
    }
    endTime=lastRecordTime
    flush the data in responseStream
    // execute WaitStrategy if needed
    if (startTime<endTime)
    {
        execute waitAlgorithm set by manager server
            node
            or
        based on values decided by Node_Monitoring_Thread
    }
    }
    Flush the response stream;
    Close the response stream;
}
```

Figure 10:
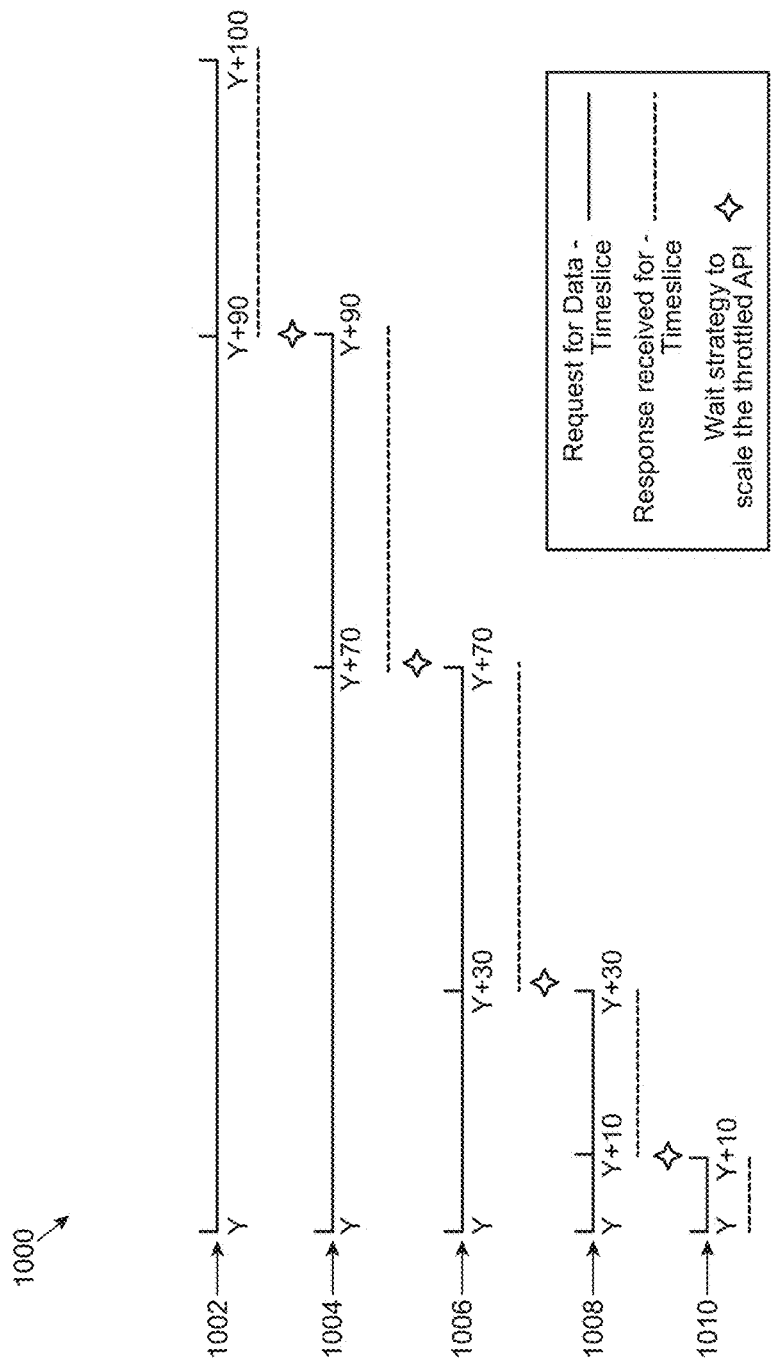
FIG. 10 is a diagram illustrating an execution flow of an example runtime of a task, according to some example embodiments.

FIG. 10 illustrates an execution flow 1000 showing one example of a simple runtime of a task. A customer (e.g., via a client device 110 or third party server 130) may request data from Y to Y+100. The request may be received at server system 102 (e.g., via API gateway 120). In one example, the API gateway 120 may execute the call, via one or more processors, with customer supplied parameters. The API may be throttled to return data from only Y+100 to Y+90, as shown in operation 1002. Instead of ending the call, the one or more processors return the data from Y+100 to Y+90 and keep the out stream open. The one or more processors execute a wait strategy based on the API requirements or system resources, as described above.

The one or more processors figure out the time of the last data returned, which is Y+90 in this case. In operation 1004, the one or more processors execute a call for Y to Y+90. The API being throttled returns data from only Y+90 to Y+70. Instead of ending the call, the one or more processors return this data and keeps the out stream open. The one or more processors execute a wait strategy based on the API requirements or system resources, as described above.

The one or more processors figure out the time of the last data returned, which is Y+70 in this case. In operation 1006, the one or more processors execute a call for Y to Y+70. The API may be throttled to return data from only Y+70 to Y+30. Instead of ending the call, the one or more processors return this data and keeps the out stream open. The one or more processors execute a wait strategy based on the API requirements or system resources, as described above.

The one or more processors figure out the time of the last data returned, which is Y+30 in this case. In operation 1008, the one or more processors execute a call for Y to Y+30. The API may be throttled to return data from only Y+30 to Y+10. Instead of ending the call, the one or more processors return this data and keeps the out stream open. The one or more processors execute a wait strategy based on the API requirements or system resources, as described above.

The one or more processors figure out the time of the last data returned, which is Y+10 in this case. In operation 1010, the one or more processors execute a call for Y to Y+10. The API may be throttled to return data from only Y+10 to Y. The one or more processors return this data, flush the stream, and close the connection, since the entire requested data is returned.

Figure 11:
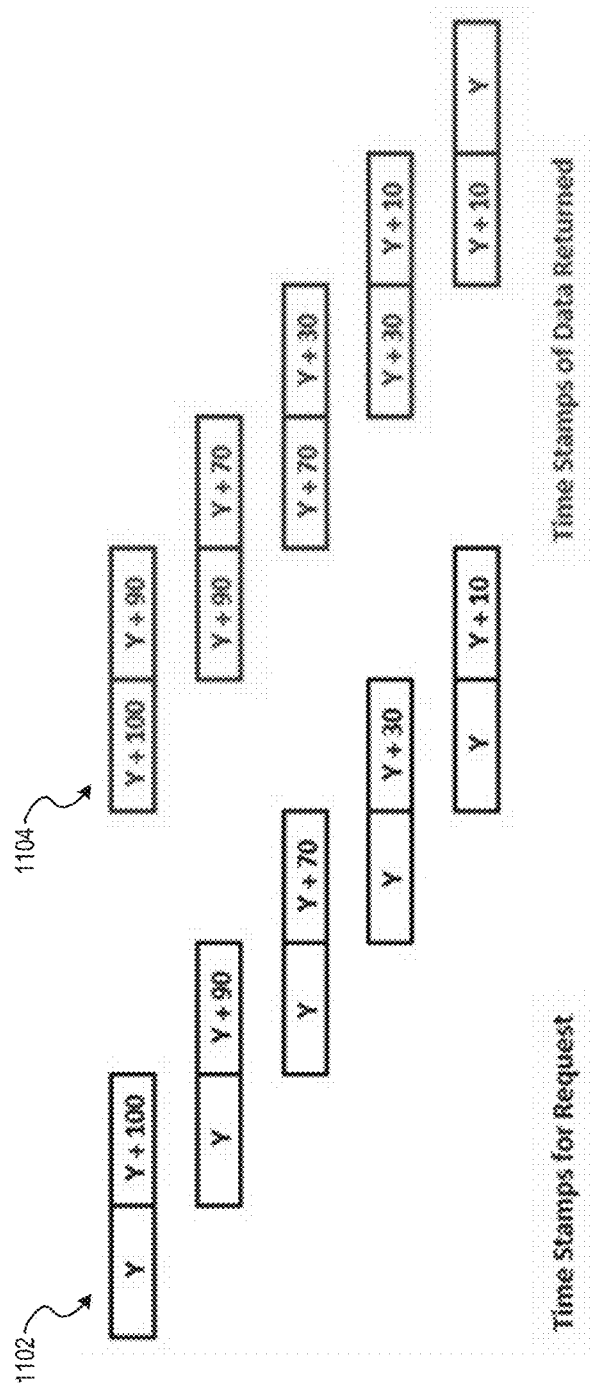
FIG. 11 is a diagram illustrating time stamps for a request for data and time stamps of data returned in the example illustrated in FIG. 10, according to some example embodiments.

FIG. 11 illustrates time stamps for the request for data 1102 and time stamps of data returned 1104 in the example illustrated in FIG. 10.

In one example, when a system experiences a heavy load or slowness, a heavy load algorithm may take over and bypass any suggested wait time strategy. In another example, if system resources are idle or under-utilized (e.g., primarily happens during periods of low activity), an idle resources algorithm may take over and bypass any suggested wait time strategy. The following examples of waiting algorithms may be used according to various example embodiments described herein.

An example default algorithm where the wait is based on system resources and execution of a previous run, may comprise the following:
MinimumWaitTime—500 ms (configurable)
DefaultWaitTime—1500 ms (configurable)
MaximumWaitTime—5000 ms (configurable)
CPU Load 80%=2.0 (configurable)
CPU Load 60%=1.5 (configurable)
Memory Consumption 80%=2.5 (configurable)
Memory Consumption 60%=2.0 (configurable)
Memory Consumption 40%=1.5 (configurable)
runtimefactor=1
runtimefactor=runTime/FirstCallRuntime
double waitTime=DefaultWaitTime;
waitTime *=factor
waitTime *=getCPULoadFactor( )
waitTime *=getMemoryLoadFactor( )
waitTime=Math.round(waitTime)
waitTime=Math.min(Math.max(waitTime, MinimumWaitTime), MaximumWaitTime);

Another example wait algorithm may be a customer priority algorithm where the wait is based on a priority of a customer's request (e.g., based on a subscription purchased by the customer). For example:
Platinum—1.0
Gold—1.5
Silver—2.0
Bronze—3.0

| Realm ID | Subscription Type | Additional Data Subscription Factor |
|---|---|---|
| Realm 1234 | Platinum | 0.60 |
| Realm 5678 | Silver | 0.80 |
| Realm 8230 | Bronze | 1.00 (Default value) | waitTime *=requestSizeFactor*systemResourcesFactor
waitTime *=SubscriptionTypeFactorMap(getRealm( ).getSubscription)
waitTime *=Additional DataSubscriptionFactor Another example wait algorithm may be a heavy load algorithm. A goal of the heavy load algorithm may be to slow the processing of larger loads to a manageable level while the system is experiencing heavy loads. There may be no upper limit for this wait number and so it may be used to slow these requests for a long time. In one example, a system administrator may get a monitoring window or portal to update and manage these in real time.

highLoadMagicNumber=// Magic number
  // Constant
  // Configurable
  // Can be updated real time based on different types of system loads
  // Generally a big number
waitTime *=highLoadMagicNumber Another example wait algorithm may be an idle resources algorithm. A goal of this algorithm may be to speed up the processing of requests in the system so that the system resources and computing power are used to their fullest during periods of idle/low activity. There may generally be a minimum wait time (e.g., a very small number like 50 ms) configured in the system to ensure fairness and proper functioning of the system.

MinimumWaitTime—50 ms (configurable)
idleOrLowUtilizationMagicNumber=// Magic number
  // Constant
  // Configurable
  // Can be updated real time based on idle components impact
  // Generally a small sleep time
waitTime=idleOrLowUtilizationMagicNumber
waitTime=Math.min(waitTime, MinimumWaitTime)

Another example wait algorithm may be a limiting wait algorithm. A goal of this algorithm may be to ensure that only a maximum of X API requests execute in a period of N seconds.

ListOfPendingRequests; //A list of the start time of current requests
MaxNumberOfRequests=X
AverageExecutionTime; //the execution time being non-deterministic, average is the best statistic
When a new request comes
if(ListOfPendingRequests.count( )<MaxNumberOfRequests
}
  StartTimer for request execution
  Add this request to List of Pending Requests
}
else
{
  waitTime=AverageExecutionTime−start time
}
When a request finishes
{
  Remove this request from List of Pending Requests
  Update the average execution time
}

Another example wait algorithm may be a fairness algorithm. A goal of this algorithm may be to ensure that all realms get a chance to execute their long requests.
Maintain count of requests executed by each realm in past N seconds.
If it reaches a threshold Y
return a slightly larger number to stop this realms request
reset the execution counter for this realm Another example wait algorithm may be a limiting with fairness algorithm. This may be a combination of the above limiting algorithm and fairness algorithm.

Another example wait algorithm may be a limit processing with queuing algorithm. A goal of this algorithm is to ensure that only a maximum of X API requests execute in a period of N seconds. Remaining requests are queued up.

rate=X
period=N
allowance=rate
last_check=now( )
when (message_received):
  current=now( );
  time_passed=current−last_check;
  last_check=current;
  allowance+=time_passed*(rate/period);
  if (allowance>rate):
  allowance=rate;
  if (allowance<1.0):
  time.sleep((1−allowance)*(period/rate))
  forward_message( );
  allowance=0.0;
  else:
  forward_message( );
  allowance−=1.0;

The following examples describe various embodiments of methods, machine-readable media, and systems (e.g., machines, devices, or other apparatus) discussed herein.

Example 1

A method comprising:

receiving, at a manager server node for a cluster comprising a plurality of client nodes, a request for an allocation of a task;

determining, by at least one processor of the manager server node, a node type for the task, based on mapping the task to a list of categories, wherein at least two of categories in the list of categories overlap in range;

searching, by the manager server node, for available client nodes based on the node type for the task to select a client node to allocate the task;

determining, by the at least one processor of the manager server node, a zone of the selected client node, wherein the zone is mapped to the list of categories;

determining, by the at least one processor of the manager server node, a wait algorithm associated with the zone of the selected node; and contacting, by the manager server node, the selected client node and passing the task and the wait algorithm to the selected client node.

Example 2

A method according to Example 1, wherein the categories in the list of categories comprise at least a central processing unit (CPU) usage category and an input/output (I/O) usage category.

Example 3

A method according to any of the previous examples, wherein the CPU usage category comprises at least one subcategory from a list comprising: idle, average, and overloaded.

Example 4

A method according to any of the previous examples, wherein the CPU usage category comprises at least two subcategories with overlapping ranges.

Example 5

A method according to any of the previous examples, wherein the I/O usage category comprises at least one subcategory from a list comprising: negligible, light, medium, and heavy.

Example 6

A method according to any of the previous examples, wherein determining a node type for the task, based on mapping the task to a list of categories, further comprises determining a central processing unit (CPU) usage category and an input/output (I/O) usage category for the task.

Example 7

A method according to any of the previous examples, wherein determining the wait algorithm for the task comprises determining that a wait algorithm should be computed based on a status of the selected client node.

Example 8

A method according to any of the previous examples, further comprising:
updating allocation details with the task assigned to the selected client node.

Example 9

A method according to any of the previous examples, further comprising:
receiving a status message for the selected client node;
determining that a zone associated with the selected client node is different from a stored zone for the client node;
updating records for the cluster with the different zone;
determining a wait algorithm for the selected client node based on the different zone; and
sending the wait algorithm to the selected client node.

Example 10

A method according to any of the previous examples, wherein searching for available client nodes based on the node type for the task to select a client node to allocate the task comprises determining which available client nodes have a status associated with the node type for the task.

Example 11

A method according to any of the previous examples, wherein the client node processes the task using the wait algorithm.

Example 12

A server computer comprising:
at least one processor; and
a computer-readable medium coupled with the at least one processor, the computer-readable medium comprising instructions stored thereon that are executable by the at least one processor to cause the server computer to perform operations comprising:
receiving a request for an allocation of a task in a cluster comprising a plurality of client nodes;
determining a node type for the task, based on mapping the task to a list of categories, wherein at least two of categories in the list of categories overlap in range;
searching for available client nodes based on the node type for the task to select a client node to allocate the task;
determining a zone of the selected client node, wherein the zone is mapped to the list of categories;
determining a wait algorithm associated with the zone of the selected node; and
contacting the selected client node and passing the task and the wait algorithm to the selected client node.

Example 13

A server computer according to any of the previous examples, wherein the categories in the list of categories comprise at least a central processing unit (CPU) usage category and an input/output (I/O) usage category.

Example 14

A server computer according to any of the previous examples, wherein the CPU usage category comprises at least one subcategory from a list comprising: idle, average, and overloaded; and wherein CPU usage category comprises at least two subcategories with overlapping ranges.

Example 15

A server computer according to any of the previous examples, wherein the I/O usage category comprises at least one subcategory from a list comprising: negligible, light, medium, and heavy.

Example 16

A server computer according to any of the previous examples, wherein determining a node type for the task, based on mapping the task to a list of categories, further comprises determining a central processing unit (CPU) usage category and an input/output (I/O) usage category for the task.

Example 17

A server computer according to any of the previous examples, wherein determining the wait algorithm for the task comprises determining that a wait algorithm should be computed based on a status of the selected client node.

Example 18

A server computer according to any of the previous examples, the operations further comprising:
receiving a status message for the selected client node;
determining that a zone associated with the selected client node is different from a stored zone for the client node;
updating records for the cluster with the different zone;
determining a wait algorithm for the selected client node based on the different zone; and
sending the wait algorithm to the selected client node.

Example 19

A server computer according to any of the previous examples, wherein searching for available client nodes based on the node type for the task to select a client node to allocate the task comprises determining which available client nodes have a status associated with the node type for the task.

Example 20

A non-transitory computer-readable medium comprising instructions stored thereon that are executable by at least one processor to cause a computing device to perform operations comprising:
receiving a request for an allocation of a task in a cluster comprising a plurality of client nodes;
determining a node type for the task, based on mapping the task to a list of categories, wherein at least two of categories in the list of categories overlap in range;
searching for available client nodes based on the node type for the task to select a client node to allocate the task;
determining a zone of the selected client node, wherein the zone is mapped to the list of categories;
determining a wait algorithm associated with the zone of the selected node; and
contacting the selected client node and passing the task and the wait algorithm to the selected client node.

Figure 12:
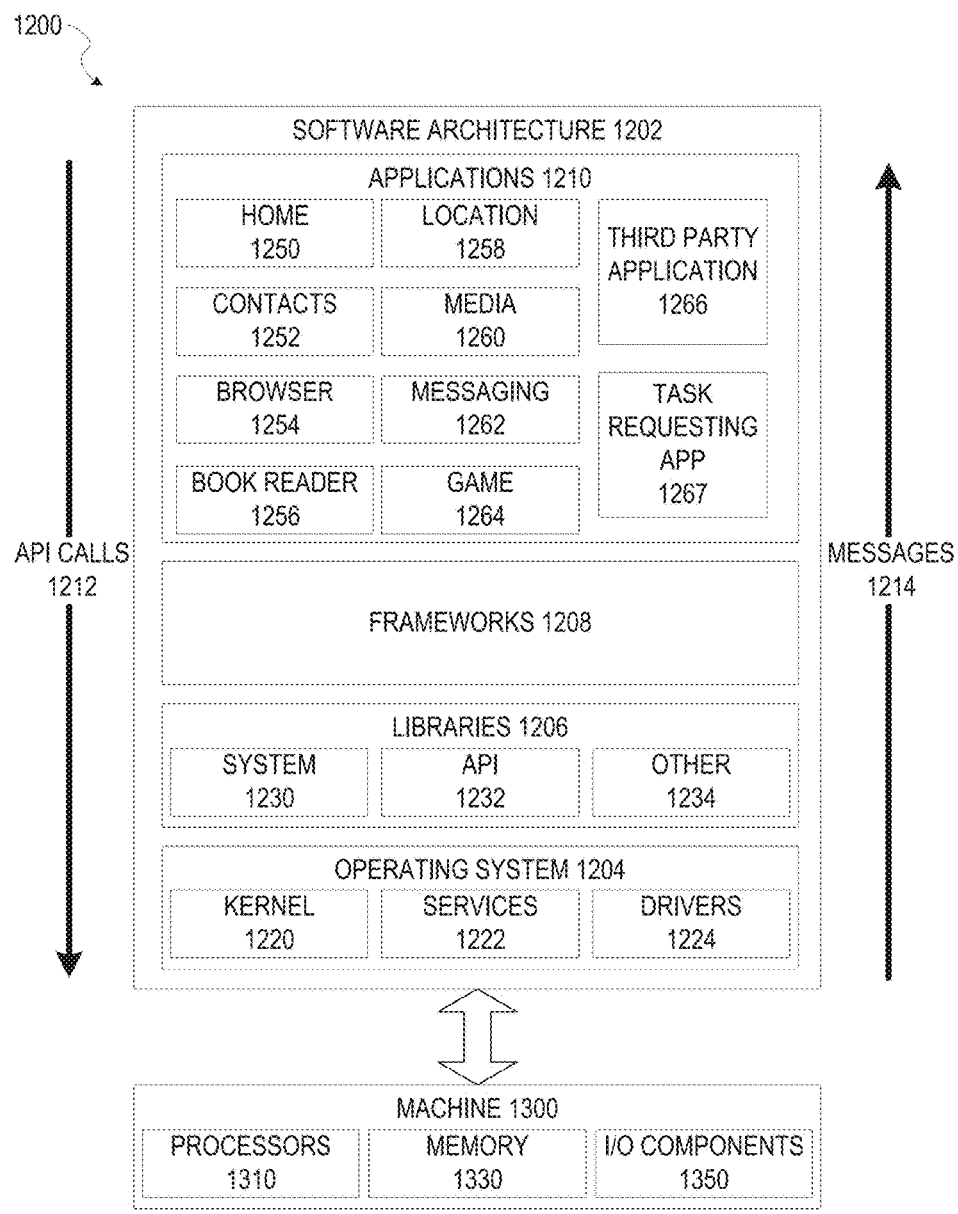
FIG. 12 is a block diagram illustrating an example of a software architecture that may be installed on a machine, according to some example embodiments.

FIG. 12 is a block diagram 1200 illustrating software architecture 1202, which can be installed on any one or more of the devices described above. For example, in various embodiments, client devices 110 and server systems 130, 102, 120, 122, and 124 may be implemented using some or all of the elements of software architecture 1202. FIG. 12 is merely a non-limiting example of a software architecture, and it will be appreciated that many other architectures can be implemented to facilitate the functionality described herein. In various embodiments, the software architecture 1202 is implemented by hardware such as machine 1300 of FIG. 13 that includes processors 1310, memory 1330, and I/O components 1350. In this example, the software architecture 1202 can be conceptualized as a stack of layers where each layer may provide a particular functionality. For example, the software architecture 1202 includes layers such as an operating system 1204, libraries 1206, frameworks 1208, and applications 1210. Operationally, the applications 1210 invoke application programming interface (API) calls 1212 through the software stack and receive messages 1214 in response to the API calls 1212, consistent with some embodiments.

In various implementations, the operating system 1204 manages hardware resources and provides common services. The operating system 1204 includes, for example, a kernel 1220, services 1222, and drivers 1224. The kernel 1220 acts as an abstraction layer between the hardware and the other software layers, consistent with some embodiments. For example, the kernel 1220 provides memory management, processor management (e.g., scheduling), component management, networking, and security settings, among other functionality. The services 1222 can provide other common services for the other software layers. The drivers 1224 are responsible for controlling or interfacing with the underlying hardware, according to some embodiments. For instance, the drivers 1224 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 1206 provide a low-level common infrastructure utilized by the applications 1210. The libraries 1206 can include system libraries 1230 (e.g., C standard library) that can provide functions such as memory allocation functions, string manipulation functions, mathematic functions, and the like. In addition, the libraries 1206 can include API libraries 1232 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and in three dimensions (3D) graphic content on a display), database libraries (e.g., SQLite to provide various relational database functions), web libraries (e.g., WebKit to provide web browsing functionality), and the like. The libraries 1206 can also include a wide variety of other libraries 1234 to provide many other APIs to the applications 1210.

The frameworks 1208 provide a high-level common infrastructure that can be utilized by the applications 1210, according to some embodiments. For example, the frameworks 1208 provide various graphic user interface (GUI) functions, high-level resource management, high-level location services, and so forth. The frameworks 1208 can provide a broad spectrum of other APIs that can be utilized by the applications 1210, some of which may be specific to a particular operating system 1204 or platform.

In an example embodiment, the applications 1210 include a home application 1250, a contacts application 1252, a browser application 1254, a book reader application 1256, a location application 1258, a media application 1260, a messaging application 1262, a game application 1264, and a broad assortment of other applications such as a third party applications 1266. According to some embodiments, the applications 1210 are programs that execute functions defined in the programs. Various programming languages can be employed to create one or more of the applications 1210, structured in a variety of manners, such as object-oriented programming languages (e.g., Objective-C, Java, or C++) or procedural programming languages (e.g., C or assembly language). In a specific example, the third party application 1266 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third party application 1266 can invoke the API calls 1212 provided by the operating system 1204 to facilitate functionality described herein.

Some embodiments may particularly include a task requesting application 1267, which may be any application that requests data or other tasks to be performed by systems and servers described herein, such as server system 102, third party servers 130, and so forth. In certain embodiments, this may be a standalone application that operates to manage communications with a server system such as third party servers 130 or server system 102. In other embodiments, this functionality may be integrated with another application. The task requesting application 1267 may request and display various data related to the task and may provide the capability for a user 106 to input data related to the system via voice, a touch interface, a keyboard, or using a camera device of machine 1300, communication with a server system via I/O components 1350, and receipt and storage of object data in memory 1330. Presentation of information and user inputs associated with the information may be managed by task requesting application 1267 using different frameworks 1208, library 1206 elements, or operating system 1204 elements operating on a machine 1300.

Figure 13:
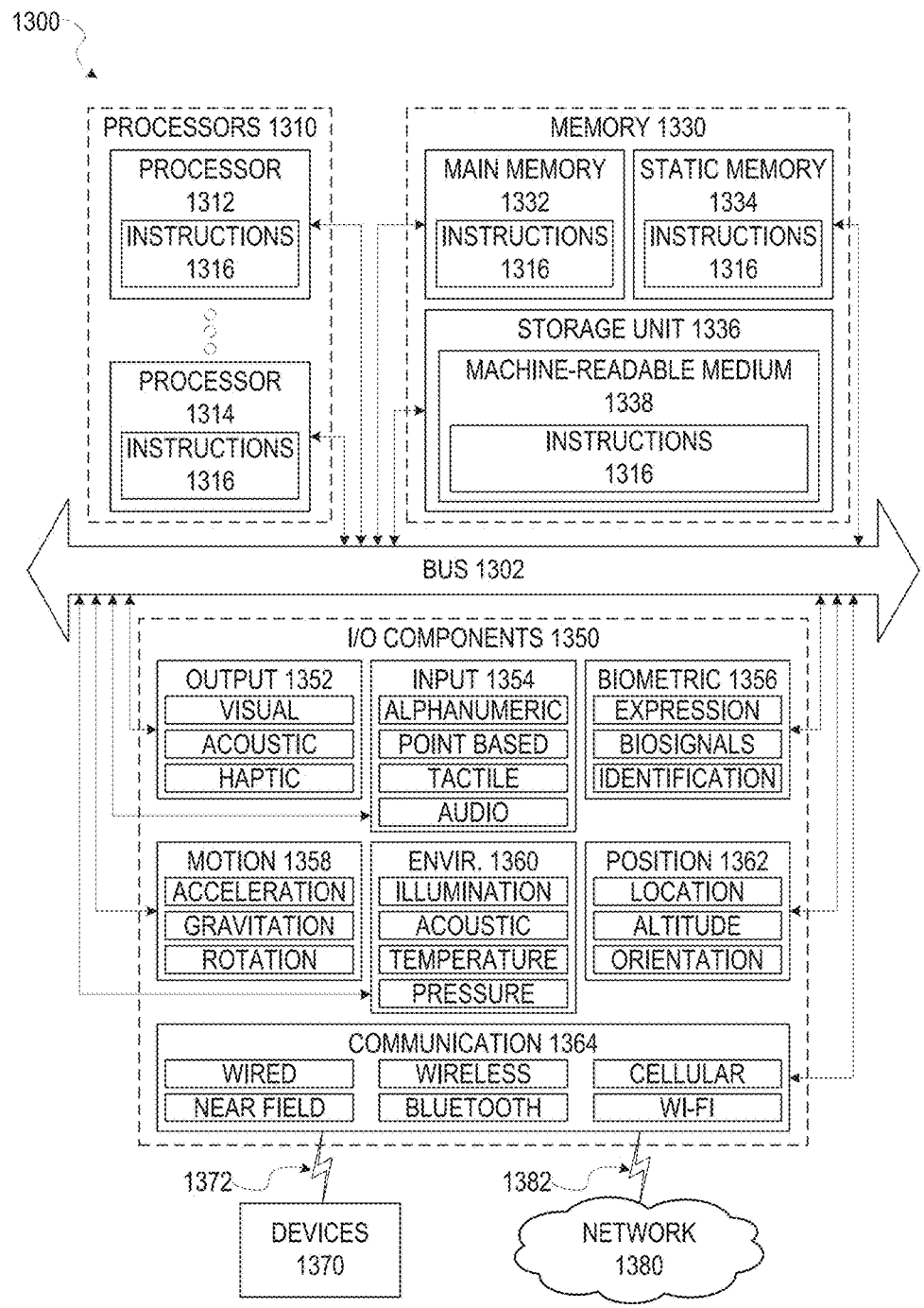
FIG. 13 illustrates a diagrammatic representation of a machine, in the form of a computer system, within which a set of instructions may be executed for causing the machine to perform any one or more of the methodologies discussed herein, according to an example embodiment.

FIG. 13 is a block diagram illustrating components of a machine 1300, according to some embodiments, able to read instructions from a machine-readable medium (e.g., a machine-readable storage medium) and perform any one or more of the methodologies discussed herein. Specifically, FIG. 13 shows a diagrammatic representation of the machine 1300 in the example form of a computer system, within which instructions 1316 (e.g., software, a program, an application 1210, an applet, an app, or other executable code) for causing the machine 1300 to perform any one or more of the methodologies discussed herein can be executed. In alternative embodiments, the machine 1300 operates as a standalone device or can be coupled (e.g., networked) to other machines. In a networked deployment, the machine 1300 may operate in the capacity of a server machine 130, 102, 120, 122, 124, and the like, or a client device 110 in a server-client network environment, or as a peer machine in a peer-to-peer (or distributed) network environment. The machine 1300 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1316, sequentially or otherwise, that specify actions to be taken by the machine 1300. Further, while only a single machine 1300 is illustrated, the term "machine" shall also be taken to include a collection of machines 1300 that individually or jointly execute the instructions 1316 to perform any one or more of the methodologies discussed herein.

In various embodiments, the machine 1300 comprises processors 1310, memory 1330, and I/O components 1350, which can be configured to communicate with each other via a bus 1302. In an example embodiment, the processors 1310 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 1312 and a processor 1314 that may execute the instructions 1316. The term "processor" is intended to include multi-core processors 1310 that may comprise two or more independent processors 1312, 1314 (also referred to as "cores") that can execute instructions 1316 contemporaneously. Although FIG. 13 shows multiple processors 1310, the machine 1300 may include a single processor 1310 with a single core, a single processor 1310 with multiple cores (e.g., a multi-core processor 1310), multiple processors 1312, 1314 with a single core, multiple processors 1312, 1314 with multiples cores, or any combination thereof.

The memory 1330 comprises a main memory 1332, a static memory 1334, and a storage unit 1336 accessible to the processors 1310 via the bus 1302, according to some embodiments. The storage unit 1336 can include a machine-readable medium 1338 on which are stored the instructions 1316 embodying any one or more of the methodologies or functions described herein. The instructions 1316 can also reside, completely or at least partially, within the main memory 1332, within the static memory 1334, within at least one of the processors 1310 (e.g., within the processor's cache memory), or any suitable combination thereof, during execution thereof by the machine 1300. Accordingly, in various embodiments, the main memory 1332, the static memory 1334, and the processors 1310 are considered machine-readable media 1338.

As used herein, the term "memory" refers to a machine-readable medium 1338 able to store data temporarily or permanently and may be taken to include, but not be limited to, random-access memory (RAM), read-only memory (ROM), buffer memory, flash memory, and cache memory. While the machine-readable medium 1338 is shown, in an example embodiment, to be a single medium, the term "machine-readable medium" should be taken to include a single medium or multiple media (e.g., a centralized or distributed database, or associated caches and servers) able to store the instructions 1316. The term "machine-readable medium" shall also be taken to include any medium, or combination of multiple media, that is capable of storing instructions (e.g., instructions 1316) for execution by a machine (e.g., machine 1300), such that the instructions 1316, when executed by one or more processors of the machine 1300 (e.g., processors 1310), cause the machine 1300 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 1350 include a wide variety of components to receive input, provide output, produce output, transmit information, exchange information, capture measurements, and so on. In general, it will be appreciated that the I/O components 1350 can include many other components that are not shown in FIG. 13. The I/O components 1350 are grouped according to functionality merely for simplifying the following discussion, and the grouping is in no way limiting. In various example embodiments, the I/O components 1350 include output components 1352 and input components 1354. The output components 1352 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1354 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the IO components 1350 include biometric components 1356, motion components 1358, environmental components 1360, or position components 1362, among a wide array of other components. For example, the biometric components 1356 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1358 include acceleration sensor components (e.g., accelerometer), gravitation sensor components, rotation sensor components (e.g., gyroscope), and so forth. The environmental components 1360 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 1362 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 1350 may include communication components 1364 operable to couple the machine 1300 to a network 1380 or devices 1370 via a coupling 1382 and a coupling 1372, respectively. For example, the communication components 1364 include a network interface component or another suitable device to interface with the network 1380. In further examples, communication components 1364 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 1370 may be another machine 1300 or any of a wide variety of peripheral devices (e.g., a peripheral device coupled via a Universal Serial Bus (USB)).

Moreover, in some embodiments, the communication components 1364 detect identifiers or include components operable to detect identifiers. For example, the communication components 1364 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 1364, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 1380 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 1380 or a portion of the network 1380 may include a wireless or cellular network, and the coupling 1382 may be a Code Division Multiple Access (CDMA) connection, a Global System for Mobile communications (GSM) connection, or another type of cellular or wireless coupling. In this example, the coupling 1382 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 1316 are transmitted or received over the network 1380 using a transmission medium via a network interface device (e.g., a network interface component included in the communication components 1364) and utilizing any one of a number of well-known transfer protocols (e.g., Hypertext Transfer Protocol (HTTP)). Similarly, in other example embodiments, the instructions 1316 are transmitted or received using a transmission medium via the coupling 1372 (e.g., a peer-to-peer coupling) to the devices 1370. The term "transmission medium" shall be taken to include any intangible medium that is capable of storing, encoding, or carrying the instructions 1316 for execution by the machine 1300, and includes digital or analog communications signals or other intangible media to facilitate communication of such software.

Furthermore, the machine-readable medium 1338 is non-transitory (in other words, not having any transitory signals) in that it does not embody a propagating signal. However, labeling the machine-readable medium 1338 "non-transitory" should not be construed to mean that the medium is incapable of movement; the medium 1338 should be considered as being transportable from one physical location to another. Additionally, since the machine-readable medium 1338 is tangible, the medium 1338 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computerized method, comprising:
   receiving, at a manager server node for a cluster comprising a plurality of client nodes, a request for an allocation of a task;
   determining, by at least one processor of the manager server node, a node type for the task, based on mapping the task to a list of categories, wherein values of at least two of categories in the list of categories overlap in range;
   searching, by the manager server node, for available client nodes based on the node type for the task to select a client node to allocate the task;
   determining, by the at least one processor of the manager server node, a zone of the selected client node, wherein the zone is mapped to the list of categories;
   determining, by the at least one processor of the manager server node, a wait algorithm associated with the zone of the selected node; and
   contacting, by the manager server node, the selected client node and passing the task and the wait algorithm to the selected client node.

2. The method of claim 1, wherein the categories in the list of categories comprise at least a central processing unit (CPU) usage category and an input/output (I/O) usage category.

3. The method of claim 2, wherein the CPU usage category comprises at least one subcategory from a list comprising: idle, average, and overloaded.

4. The method of claim 2, wherein the CPU usage category comprises at least two subcategories with values that overlap in range.

5. The method of claim 2, wherein the I/O usage category comprises at least one subcategory from a list comprising: negligible, light, medium, and heavy.

6. The method of claim 1, wherein determining a node type for the task, based on mapping the task to a list of categories, further comprises determining a central processing unit (CPU) usage category and an input/output (I/O) usage category for the task.

7. The method of claim 1, wherein determining the wait algorithm for the task comprises determining that a wait algorithm should be computed based on a status of the selected client node.

8. The method of claim 1, further comprising:
   updating allocation details with the task assigned to the selected client node.

9. The method of claim 1, further comprising:
   receiving a status message for the selected client node;
   determining that a zone associated with the selected client node is different from a stored zone for the client node;
   updating records for the cluster with the different zone;
   determining a wait algorithm for the selected client node based on the different zone; and
   sending the wait algorithm to the selected client node.

10. The method of claim 1, wherein searching for available client nodes based on the node type for the task to select a client node to allocate the task comprises determining which available client nodes have a status associated with the node type for the task.

11. The method of claim 1, wherein the client node processes the task using the wait algorithm.

12. A server computer comprising:
    at least one processor; and
    a computer-readable medium coupled with the at least one processor, the computer-readable medium comprising instructions stored thereon that are executable by the at least one processor to cause the server computer to perform operations comprising:
    receiving a request for an allocation of a task in a cluster comprising a plurality of client nodes;

determining a node type for the task, based on mapping the task to a list of categories, wherein values of at least two of categories in the list of categories overlap in range;

searching for available client nodes based on the node type for the task to select a client node to allocate the task;

determining a zone of the selected client node, wherein the zone is mapped to the list of categories;

determining a wait algorithm associated with the zone of the selected node; and contacting the selected client node and passing the task and the wait algorithm to the selected client node.

13. The server computer of claim 12, wherein the categories in the list of categories comprise at least a central processing unit (CPU) usage category and an input/output (I/O) usage category.

14. The server computer of claim 13, wherein the CPU usage category comprises at least one subcategory from a list comprising: idle, average, and overloaded; and wherein CPU usage category comprises at least two subcategories with values that overlap in range.

15. The server computer of claim 13, wherein the I/O usage category comprises at least one subcategory from a list comprising: negligible, light, medium, and heavy.

16. The server computer of claim 12, wherein determining a node type for the task, based on mapping the task to a list of categories, further comprises determining a central processing unit (CPU) usage category and an input/output (I/O) usage category for the task.

17. The server computer of claim 12, wherein determining the wait algorithm for the task comprises determining that a wait algorithm should be computed based on a status of the selected client node.

18. The server computer of claim 12, the operations further comprising:

receiving a status message for the selected client node;

determining that a zone associated with the selected client node is different from a stored zone for the client node;

updating records for the cluster with the different zone;

determining a wait algorithm for the selected client node based on the different zone; and sending the wait algorithm to the selected client node.

19. The server computer of claim 12, wherein searching for available client nodes based on the node type for the task to select a client node to allocate the task comprises determining which available client nodes have a status associated with the node type for the task.

20. A non-transitory computer-readable medium comprising instructions stored thereon that are executable by at least one processor to cause a computing device to perform operations comprising:

receiving a request for an allocation of a task in a cluster comprising a plurality of client nodes;

determining a node type for the task, based on mapping the task to a list of categories, wherein values of at least two of categories in the list of categories overlap in range;

searching for available client nodes based on the node type for the task to select a client node to allocate the task;

determining a zone of the selected client node, wherein the zone is mapped to the list of categories;

determining a wait algorithm associated with the zone of the selected node; and contacting the selected client node and passing the task and the wait algorithm to the selected client node.

* * * * *